(12) United States Patent
Welzel

(10) Patent No.: US 8,521,226 B2
(45) Date of Patent: Aug. 27, 2013

(54) IMPLEMENTATION OF THE USER INTERFACE OF MOBILE TELEPHONES BASED ON BROWSER TECHNOLOGY

(75) Inventor: Thomas Welzel, Bad Honnef (DE)

(73) Assignee: Deutsche Telekom AG, Bonn (DE)

( * ) Notice: Subject to any disclaimer, the term of this patent is extended or adjusted under 35 U.S.C. 154(b) by 432 days.

(21) Appl. No.: 12/742,268

(22) PCT Filed: Oct. 16, 2008

(86) PCT No.: PCT/EP2008/008758
§ 371 (c)(1),
(2), (4) Date: Jun. 9, 2010

(87) PCT Pub. No.: WO2009/074188
PCT Pub. Date: Jun. 18, 2009

(65) Prior Publication Data
US 2010/0255881 A1    Oct. 7, 2010

(30) Foreign Application Priority Data

Dec. 11, 2007  (DE) ........................ 10 2007 059 972

(51) Int. Cl.
*H04W 88/02* (2009.01)
(52) U.S. Cl.
USPC ...... 455/557; 455/566; 455/556.1; 455/550.1
(58) Field of Classification Search
USPC .................. 455/556.2, 3.06, 418, 419, 550.1, 455/551, 556.1, 557, 558, 566, 90.1, 552.1; 709/217, 202, 218
See application file for complete search history.

(56) References Cited

U.S. PATENT DOCUMENTS

| | | | |
|---|---|---|---|
| 7,228,340 B2 * | 6/2007 | De Boor et al. | 709/217 |
| 7,293,271 B2 | 11/2007 | Trossen | |
| 7,828,203 B2 | 11/2010 | Sonetaka | |
| 8,276,809 B2 | 10/2012 | Hugot | |
| 2004/0220943 A1 * | 11/2004 | Ross et al. | 707/100 |
| 2007/0155425 A1 * | 7/2007 | Balakrishnan et al. | 455/556.2 |
| 2007/0260749 A1 | 11/2007 | Lahdensivu | |
| 2007/0276949 A1 | 11/2007 | Mergi | |

FOREIGN PATENT DOCUMENTS

| | | |
|---|---|---|
| EP | 1331559 A | 7/2003 |
| WO | 03041373 A | 5/2003 |

\* cited by examiner

*Primary Examiner* — John J Lee
(74) *Attorney, Agent, or Firm* — Andrew Wilford

(57) ABSTRACT

The invention relates to a mobile communications terminal device having a user interface for operating the mobile communications terminal device and/or use of services accessible via a mobile communications network, having a menu structure and a graphic user interface for visualizing the menu structure, wherein the mobile communications terminal device is operated by means of an operating system, wherein the user interface may be implemented independently of the operating system of the mobile communications terminal device, particularly in a network provider-specific fashion, and the data required for the user interface may be supplied by a memory unit independent of the mobile communications terminal device.

8 Claims, 2 Drawing Sheets

IMPLEMENTATION OF THE USER INTERFACE OF MOBILE TELEPHONES BASED ON BROWSER TECHNOLOGY

CROSS REFERENCE TO RELATED APPLICATIONS

This application is the US national phase of PCT application PCT/EP2008/0087578, filed 16 Oct. 2008, published 18 Jun. 2009 as WO2009/074188, and claiming the priority of German patent application 102007059972.4 itself filed 11 Dec. 2007.

FIELD OF THE INVENTION

The present invention relates to a mobile radio terminal having a user interface for controlling the mobile radio terminal and/or for using services that can be called up via a mobile radio network, having a menu structure and having a graphical (usage interface) surface for visualization of the menu structure, wherein the mobile radio terminal is controlled by an operating system.

BACKGROUND OF THE INVENTION

Mobile radio terminals such as mobile telephones for modern GSM and UMTS mobile radio networks (GSM, Global System for Mobile Communication, UMTS, Universal Mobile Telecommunication System) are produced by manufacturers who are not also at the same time providers of mobile radio services or mobile radio network operators. The manufacturers directly equip their mobile telephones with the operating system required for controlling the mobile telephones and for setting up network services, as well as the required standard software, that can adequately control the majority of the services offered by the network operators and network providers. However, network providers and operators are increasingly demanding that mobile telephones be equipped with software that is matched to the specific network offered by the network provider and/or to the individual appearance of the network provider on appearance on the market, for example in terms of color and shape, or else in the imaging of the network-operator-specific services.

The network providers, which term also means network operators in the following text, therefore desire customized software from the mobile telephone manufacturers, for example a special choice of background images for the display, that is to say the graphic display on the mobile telephone, that are typical of the appearance of the network provider on the market, such as particular ring tones, special call numbers, settings for network services such as call diversion, mailbox, messaging services etc., as well as menu functions that refer to network-operator-specific services or already map them, and that are already set up or preselected in the mobile telephone. The customization processes in this case relate mainly to the menu-based user guidance in the mobile radio terminal, such as a mobile telephone, that is to say to the user interface between the mobile radio terminal and its user, which must be matched to the services made available by the network provider, both with regard to its graphical usage surface and with regard to the scope, type and content of the selectable menus.

The known terminals, for example for GSM and UMTS mobile radio networks, have menu-based user guidance that is in general a fixed component of the operating system (RTOS, run-time operating system). It can be modified only by the terminal manufacturer, by amending the software in the terminal. This results in considerable restrictions for customization of terminals for the individual network provider. Software can be modified only at an unacceptably high implementation cost, and is therefore extremely inflexible, and costly at the same time. Furthermore, this involves an unacceptable time penalty, bearing in mind the time pressure resulting from the time-to-market requirements of the network providers.

In addition to the operating-system-integrated solution, there are so-called open operating systems for mobile radio terminals, such as the Symbian OS operating system, a proprietary operating system for Smartphones and PDAs (personal digital assistants). In these open operating systems, the user interface is applied to the operating system by the terminal manufacturer. However, even this solution results in a rigid system that can be matched only to a minor extent to the requirement and wishes of the network providers.

OBJECT OF THE INVENTION

The invention is therefore based on the object of developing a mobile radio terminal such that a user interface is made available that allows simple and efficient matching to the network-provider-specific wishes and network services offered, universally and to match the demand, with the aim being to ensure the greatest possible flexibility for customization, in particular with regard to modifications and/or additions to the user interface to be implemented retrospectively, for example as a consequence of a network service upgrade. A further object of the invention is to make available the means required for implementation of the user interface, and required, and required for use of the user interface.

SUMMARY OF THE INVENTION

According to the invention, this object is achieved in that, in the case of the mobile radio terminal having a user interface for controlling the mobile radio terminal and/or for using services that can be called up via a mobile radio network, having a menu structure and having a graphical usage surface for visualization of the menu structure, wherein the mobile radio terminal is controlled by an operating system, the user interface can be implemented independently of the operating system of the mobile radio terminal, in particular can be implemented on a network-provider-specific basis, and that the data that is required for the user interface can be supplied from a memory unit that is independent of the mobile radio terminal.

This allows the user interface to be implemented independently of the operating system and therefore to be designed independently of the terminal itself. Data required for the user interface should be understood as meaning, in particular, that data that is required to set up the menu structure as well as to display the menu structure in the graphical usage surface for visualization of the menu structure.

A mobile radio terminal is proposed having a user interface that makes it possible for network providers to customize terminals in accordance with their own market appearance and service portfolio; contents, for example in the form of images, tones or videos, can be displayed in a standard execution environment; applications can be executed in the execution environment; the menu structure of the terminal can be displayed in the execution environment; with involvement in mobile radio, the subscriber is provided in an automated and selective form with his own contents, for example images, tones, videos, programs and/or program parts, via the identification module of the terminal; the user interface can be modified, deleted or completely reloaded, for example for updating purposes, flexibly and easily via a data link between the terminal and a computer of the corresponding network provider, or some other service provider.

In order to implement a user interface such as this between a mobile radio terminal and the user who is using the terminal, in order to control the terminal and/or to use services made available by the provider of the telecommunications network or a third party, with a menu structure and a graphical usage surface for visualization of the menu structure, it is proposed that the user interface be implemented independently of the operating system of the terminal, such that it can be customized by the network provider in accordance with his market appearance and/or service portfolio and that this be stored on a memory unit that is independent of the terminal—depending on the application. This allows the greatest possible flexibility to be achieved for the network providers, who can themselves implement the menu structure, menu contents and graphical configuration of the usage surface, and can retrospectively modify and/or upgrade these in a simple and cost-effective manner.

The user interface is in the form of a graphical usage surface with menu guidance designed on a graphical- and a network-provider-specific basis, which allows the user access to the entire terminal functionality, all the services offered by the network provider, as well as further data and applications. The identification module of the terminal can be used as the memory unit for the software-based user interface, and the user interface can be implemented generically on this. By way of example, the identification module may be the SIM card (subscriber identity module) or USIM card (universal subscriber identity module) of a mobile telephone.

In one alternative refinement of the invention, the unit is may be a computer, in particular a server of the network provider or of a third party, on which the usage surface is implemented. In this case, a link to set up a data link to the server is stored on the identification module. By way of example, the link may be a uniform resource locator (URL), that is to say a server address in the World Wide Web, via which the server of the network provider or of the third party can be accessed via an Internet link, that is to say an online data link.

In this case, the user interface can be used in the form of an online menu structure via the Internet, with access to the server. However, the user interface may be preferably configured such that a link to a server of the network provider or of a third party is first of all set up with the aid of the links stored on the identification module, and the menu structure of the user interface is then downloaded to the terminal or the identification module. This has the advantage that the network provider or the third party can always keep a current version of the user interface on the server, and make this available to the subscriber. The user interface may preferably have a menu function by means of which it is possible to download the menu structure in this way at a later time. This allows the user interface to be updated easily and quickly.

According to the invention, the graphical usage surface of the user interface can be displayed and controlled using a standard execution environment on the display of the terminal. Menus with functions of the terminal or services of the network provider or of a third party may in this case be selected easily is via the execution environment.

It is particularly advantageous for the execution environment to be a web browser that is optimized for use in a mobile radio terminal. Nowadays, this is already available to the majority of mobile radio terminals on the basis of the Internet capability of modern mobile telephones and allows a large number of different data formats to be displayed. New data formats can likewise be displayed by the use of plug-ins in the browser. In order to display the menu-based user guidance, at least a part of the identification module may be in the form of an http server that supplies the data required to display the usage surface of the user interface in the browser. In this case, the user interface may be programmed using a markup language, in particular using WML (Wireless Markup Language) that is part of the Wireless Application Protocol (WAP) and is used to display Internet-related contents in the browser of a mobile radio terminal. Alternatively, for example, the Interface may also be programmed using HTML (Hypertext Markup Language), XHTML (Extensible Hypertext Markup Language) or XML (Extensible Markup Language).

Furthermore, network-provider-specific data and/or applications stored on the memory unit and/or in the terminal can be associated with the user interface, can be selected via the menu structure and can be displayed and/or executed in the browser. By way of example, this may relate to network-provider-specific images, for example for the display background configuration, ring tones and music, web pages, videos, network-provider-specific or other special call numbers, for example for the mailbox or for information services, as well as setting parameters for network services such as call diversion, mailbox functions, messaging services or a network-based address book.

Furthermore, by way of example, the applications may be games or auxiliary programs such as computers, address book, text creation or calendar that can be displayed and executed in the browser. For this purpose, by way of example, a Java plug-in can be added to the browser, in order to extend its functionality, thus allowing applications programmed using Java to be executed in the browser. The data and/or applications may already be loaded by the network provider onto the information module. Alternatively or in combination, its/they or further data and/or applications can also be downloaded from a server to the mobile terminal during use of the terminal via an Internet data link, for example via a GPRS link (Global Packet Radio Service), and can be stored therein and/or on the identification module, where they are available to the user together with the already stored data and/or applications. In addition, the data and/or applications can alternatively or in combination remain on the server, and can be used via an online data link to the server.

In one particular implementation variant of the invention, parts of the menu structure of the user interface, in particular individual submenus, may be located on the terminal or on a computer of the network provider or of a third party. This makes it possible to leave specific functions that can be selected from the menu structure, for example functions that relate to functionalities of the terminal, such as Bluetooth, infrared interfaces, memory card management, camera or the like, or settings that relate to operating parameters of the terminal, such as display brightness, display indication duration, user profiles, key meanings etc., on the terminal, as a result of which the upper menu levels are configured individually by the network providers and are stored on the identification module, and individual terminal-specific submenus are configured by the terminal manufacturers and are stored in a memory in the terminal, with the user interface being complemented by the individual submenus that may be a component of the terminal RTOS.

Furthermore, in addition, individual submenus can also be stored on a server of the network provider or of a third party in order to possibly save memory space on the identification module. In this case, for example, rarely used applications, for example individual games can be moved out of the identification module. The submenus may, for example, be accessed by a link from the superordinate menu that is connected to the server via an online data link.

According to the invention, an information module of a mobile radio terminal can be provided that has a user interface with the abovementioned functionality. The identification module in this case preferably represents the SIM or USIM card of a mobile telephone, on which the user interface is implemented. In this case, at least one subarea of the identification module may be in the form of an http server that supplies the data required to display the usage surface of the user interface in a browser, wherein the user interface can be programmed using a markup is language and can be stored in the http server.

Furthermore the identification module may have a memory unit that contains network-provided specific contents and/or applications that can be selected via the menu structure of the user interface, and can be displayed or executed in a browser. In this case, by way of example, these may be network-provider-specific images, for example for the display background configuration, ring tones and music, web pages, videos, network-provider-specific or other special call numbers, for example for the mailbox or for information services, as well as setting parameters for network services such as call diversion, mailbox functions, messaging services or a network-based address book that are preset for the subscriber of the specific mobile radio network. Furthermore, by way of example, the applications may be games or auxiliary programs such as computers, address book, text creation or calendars that can be executed in the browser.

The menu-based graphical usage surface of the user interface of the mobile terminal for telecommunication, that is to say for mobile radio, is controlled such that the menu guidance is provided in an execution environment that is independent of the terminal and in which the menus of the user interface can be displayed and selected.

The execution environment is in this case preferably a mobile-terminal-optimized browser that can be used in a full-screen mode, in which the terminal display completely fills, that is to say 100% fills, its area for indication of contents. Alternatively, it is possible for the browser to permanently fill is only a lesser portion of the display area, for example between 80% and 95%, thus allowing a status bar with basic information such as battery indication, field strength and/or message indications (message waiting indicators, MWI) to remain visible in the terminal display, and to be available to the user, at the same time as the browser contents.

After the terminal has been switched on, a network-provider-specific start page is preferably displayed in the browser. In a first version, this can be downloaded by the browser from the identification module of the terminal. It is also possible to store a link, that is to say a link to a computer, in particular to a server, of the network provider or of a third party, instead of a start page on the identification module, such that, after the terminal has been switched on, a network-provider-specific start page is displayed in the browser, and is downloaded by the browser from the computer of the network provider via an Internet link, that is to say an online data link.

This can also be stored permanently in the identification module or in the terminal, such that this page is loaded and displayed, on the next occasion when the terminal is switched on. It is also possible for a start page of the terminal manufacturer to be displayed in the browser after the terminal has been switched on, which start page is downloaded by the browser from the terminal when neither a start page nor a link to a computer is stored in the identification module. This start page may preferably be a standard page of the terminal manufacturer.

One advantageous embodiment of the invention will be described, by way of example, in the following text.

A mobile telephone as a mobile radio terminal with the user interface according to the invention automatically starts, after it has been switched on, a conventional web browser that is optimized for mobile telephones, in the full-screen mode or in a section of the display, in such a way that a status bar can be displayed in the same display or in a second display in order to provide basic information such as battery indication, field strength indication and possible MWI, to the user. As an alternative to a mobile telephone, the method and the user interface according to the invention can also be used in a cordless telephone for domestic use, for example a DECT telephone (Digital Enhanced Cordless Telecommunications).

The browser opens a preset (default) start page in an HTML, WML, XML or comparable markup programming language, with the user interface according to the invention. This page is located in the memory of the SIM (subscriber identity module), and is made available by the network operator. This represents menu-based graphical guidance, in which case the mobile radio subscriber can use this page to select both telephone functions and network operator services, as well as access to further information, for example to contents such as music, images, speech, games or standard network operator services such as call diversion and call answering functions, messaging services, network-based address book, etc. In this case, in principle, no separate terminal menu functions are required. However, any desired submenus may be selected that are either located on the SIM card or on the terminal, or provide a link to a server via an online data link.

The contents contained on a SIM card can have contents added to them or can be replaced by contents that are downloaded via a mobile data link from the network provider or from some other content provider. The applications located on the SIM card can be executed both in the browser itself, for example by means of Java technology, or else in the operating system of the terminal, or other middleware layers.

Once an application has been called, it can be displayed on the display in the browser. After closing the application, the page with the start menu is automatically called up in the browser. If, on starting, the terminal does not find either an appropriate menu structure in the proposed markup format on the SIM card or a link to an online menu structure thereon, a standard menu is displayed that is defined by the terminal manufacturer, thus allowing the mobile telephone to be used even without a network-provider-specific page.

The present invention proposes a user interface for a mobile radio terminal, in which no specific implementation must be carried out on the operating system of the terminal, but that involves just a generic implementation that can be displayed in a browser and is therefore not terminal-dependent.

Furthermore, the user interface of the terminal is configured by the network provider or network operator and is preferably supplied on the SIM or USIM of the terminal. One particular advantage of the browser-based display for user guidance is the capability to activate telephone functions and/or network is services from the browser, wherein the user interface can be designed independently of the terminal manufacturer, by being independent of the operating system of the mobile radio terminal.

DETAILED DESCRIPTION OF THE INVENTION

Figure 2:
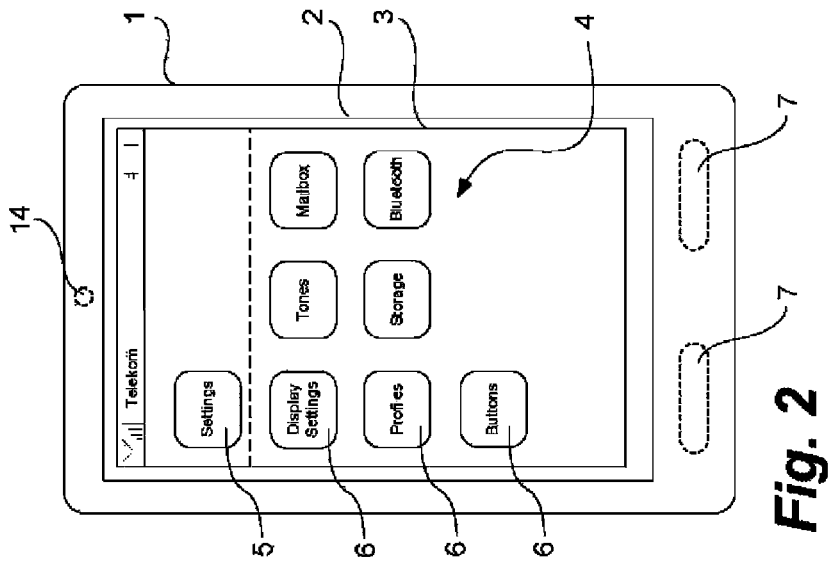
FIG. 2 shows the mobile radio terminal having a user interface with a graphical usage surface visualizing sub menus of a menu structure.
Figure 1:
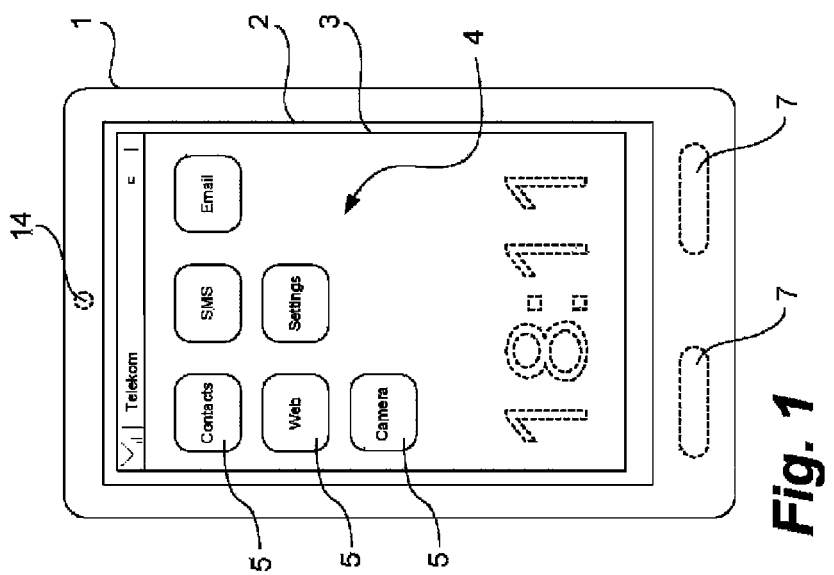
FIG. 1 shows a mobile radio terminal having a user interface with a graphical usage surface visualizing top menus of a menu structure.

FIGS. 1 and 2 show a mobile radio terminal 1 having a user interface for controlling the mobile radio terminal 1 or for using services that can be called up via a mobile radio network. The user interface has a menu structure 5, 6 and a graphical usage surface 4 for visualization of the menu structure 5, 6. The mobile radio terminal 1 further comprises a display 2, buttons 7 and a camera 14. The graphical usage surface 4 is displayed and controlled in one execution environment 3 on the display 2 of the terminal 1. The menus 5, 6 with functions of the terminal 1 or services of a provider can be selected via the execution environment 3 that here is a browser. The menus 5 of the menu structure are shown in FIG. 1, and the submenus 6 of a menu 5 of the menu structure are shown in FIG. 2.

Figure 5:
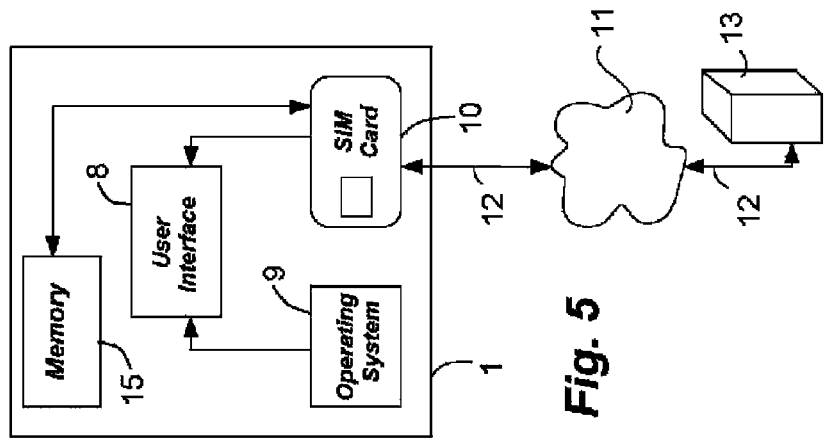
FIG. 5 is a diagram showing a third embodiment of the mobile radio terminal.
Figure 4:
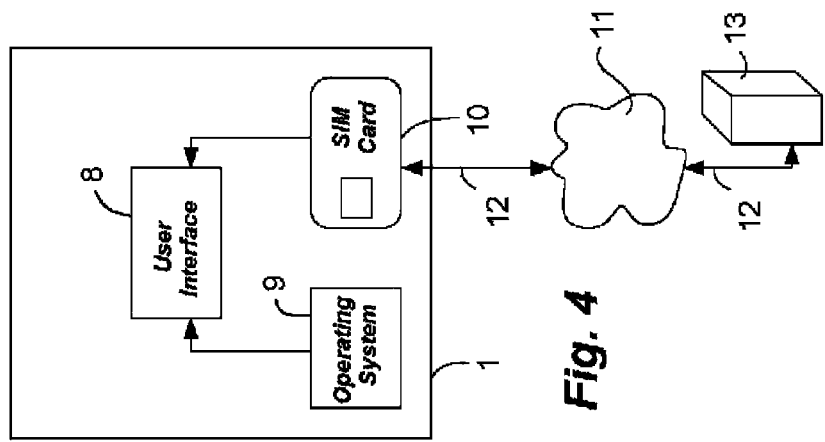
FIG. 4 is a diagram showing a second embodiment of the mobile radio terminal.
Figure 3:
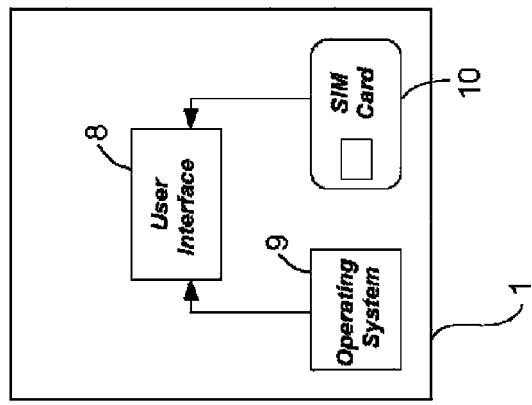
FIG. 3 is a diagram showing a first embodiment the mobile radio terminal according to the invention.

FIGS. 3 to 5 schematically show three different embodiments of the mobile radio terminal 1 according to the invention with regard to the provision of data needed for the user interface, here generally designated at 8.

In FIG. 3 the mobile radio terminal 1 is operated by an operating system generally designated at 9. The user interface 8 is implemented independently of the operating system 9 of the mobile radio terminal 1 on a network-provider-specific basis. Data required for the user interface 8 is supplied from a memory unit 10 that is independent of the mobile radio terminal 1. This memory unit 10 is an identification module that can be connected to the mobile radio terminal 1. In particular, the memory unit 10 is a SIM card.

In FIGS. 4 and 5 the memory unit is a computer 13 on which the usage surface 4 is implemented and a data link 12 to the computer 13 via a network 11 is stored on an identification module 10, and the data required for the user interface 8 can be downloaded from the computer 13. In FIG. 4 the data is downloaded to the identification module 10. In an alternative embodiment shown in FIG. 5, the data is downloaded into a memory 15 of the terminal 1.

In all the embodiments in FIGS. 3 to 5, at least a part of the identification module 10 of the mobile radio terminal 1 is configured as an http server that provides the data required for displaying the usage surface 4 of the user interface 8.

The invention claimed is:

1. A mobile radio terminal having a user interface for controlling the mobile radio terminal or for using services that can be called up via a mobile radio network, the interface further having a menu structure and a graphical usage surface for visualization of the menu structure, wherein the mobile radio terminal is operated by an operating system, the user interface can be implemented independently of the operating system of the mobile radio terminal on a to network-provider-specific basis, data required for the user interface can be supplied from a memory unit that is independent of the mobile radio terminal, either the memory unit is an identification module that can be connected to the mobile radio terminal or the memory unit is a computer on which the usage surface is implemented and a link for setting up a data link to the computer is stored on an identification module and the data required for the user interface can be downloaded from the computer to the identification module or into a memory of the terminal, the graphical usage surface can be displayed and can be controlled in one execution environment on a display of the terminal, menus with functions of the terminal or services of a provider via the execution environment can be selected, and the execution environment is a browser.

2. The mobile radio terminal as defined in claim 1, wherein the user interface is programmed using HTML, WML or XML, and can be displayed and controlled by appropriate interpreter programs.

3. The mobile radio terminal as defined in claim 1, wherein network-provider-specific data or applications stored on the memory unit or in the mobile radio terminal, and that can be selected or displayed or executed or controlled via the menu structure, is/are associated with the user interface.

4. The mobile radio terminal as defined in claim 1, wherein individual submenus or parts of the data for setting up the menu structure are located on the terminal or on a computer of the network provider or of a third party.

5. The mobile radio terminal as defined in claim 1, wherein the user interface has at least one application through which an online data link can be set up to a server.

6. The mobile radio terminal defined in claim 1, wherein the memory unit is a SIM card or a USIM card.

7. A mobile radio terminal having a user interface for controlling the mobile radio terminal or for using services that can be called up via a mobile radio network, the interface further having a menu structure and a graphical usage surface for visualization of the menu structure, wherein the mobile radio terminal is operated by an operating system, the user interface can be implemented independently of the operating system of the mobile radio terminal on a to network-provider-specific basis, data required for the user interface can be supplied from a memory unit that is independent of the mobile radio terminal, either the memory unit is an identification module that can be connected to the mobile radio terminal or the memory unit is a computer on which the usage surface is implemented and a link for setting up a data link to the computer is stored on an identification module and the data required for the user interface can be downloaded from the computer to the identification module or into a memory of the terminal, at least a part of the identification module of the mobile radio terminal is configured as an http server that provides the data required for display of the usage surface of the user interface, and the execution environment is a browser.

8. The mobile radio terminal defined in claim 7, wherein the memory unit is as SIM card or a USIM card.

* * * * *